United States Patent
Penny

(10) Patent No.: US 8,616,119 B2
(45) Date of Patent: Dec. 31, 2013

(54) STRAINING SKILLET

(76) Inventor: Phillip Penny, Cordova, TN (US)

(*) Notice: Subject to any disclaimer, the term of this patent is extended or adjusted under 35 U.S.C. 154(b) by 188 days.

(21) Appl. No.: 13/019,934

(22) Filed: Feb. 2, 2011

(65) Prior Publication Data

US 2011/0185916 A1    Aug. 4, 2011

Related U.S. Application Data

(60) Provisional application No. 61/300,882, filed on Feb. 3, 2010.

(51) Int. Cl.
- *A21B 3/13* (2006.01)
- *A47J 37/07* (2006.01)
- *A23L 3/00* (2006.01)

(52) U.S. Cl.
USPC .................................. 99/324; 99/340; 99/359

(58) Field of Classification Search
USPC ........... 99/324, 329, 337, 340, 346, 353, 355, 99/359, 380; 210/106, 110, 791–797
See application file for complete search history.

(56) References Cited

U.S. PATENT DOCUMENTS

| | | | | |
|---|---|---|---|---|
| 3,427,957 A | * | 2/1969 | Campbell | 99/446 |
| 4,574,184 A | * | 3/1986 | Wolf et al. | 219/440 |
| 5,203,836 A | * | 4/1993 | Brazis et al. | 206/507 |
| 5,323,693 A | * | 6/1994 | Collard et al. | 99/425 |
| 5,740,937 A | | 4/1998 | Sheu | |
| 5,826,494 A | | 10/1998 | Wang | |
| 5,992,308 A | * | 11/1999 | Kroscher et al. | 99/422 |
| 6,827,224 B2 | | 12/2004 | Marriot | |
| 7,021,202 B2 | | 4/2006 | Sizer | |
| 2004/0216620 A1 | * | 11/2004 | Quiggins et al. | 99/413 |
| 2005/0263011 A1 | * | 12/2005 | Golding | 99/422 |
| 2007/0261567 A1 | * | 11/2007 | Morgan | 99/422 |
| 2008/0017048 A1 | | 1/2008 | Donnellan | |

* cited by examiner

*Primary Examiner* — Tu B Hoang
*Assistant Examiner* — Michael Laflame, Jr.
(74) *Attorney, Agent, or Firm* — Daniel Boudwin

(57) ABSTRACT

An improved cooking device to assist in preparation of meals. A self-contained straining skillet allows the food to be cooked in a concave skillet insert containing a plurality of apertures, which may then be lifted to drain the grease and fat into the lower receiving skillet. Both the lining skillet and the receiving skillet may contain pour spouts to allow for effective transfer of grease. The receiving skillet, alone or with the lining skillet insert, may be used with standard size stove burners.

6 Claims, 2 Drawing Sheets

STRAINING SKILLET

CROSS REFERENCE TO RELATED APPLICATION

This application claims the benefit of U.S. Provisional Application No. 61/300,882 filed on Feb. 3, 2010, entitled "Straining Skillet."

BACKGROUND OF THE INVENTION

1. Field of the Invention

The present invention relates, in general, to cookware and, more particularly, relates to a self-contained straining system for a frying pan or skillet. The present invention further relates to a food cooking apparatus with a strainer component that may be used following the cooking process to extricate cooked food from secreted grease without spillage. Grease or other liquids may be drained from the cooked food through drainage pores and deposited in the receiving skillet, where it may then be poured out via the pouring spout allowing safe and efficient transfer of grease.

2. Description of the Prior Art

Prior to the conception and development of the present invention, frying pans and strainers, as are generally well known in the prior art, have been used in the cooking and preparation of food. Specifically of interest to the present invention are the following: Collard U.S. Pat. No. 5,323,693 discloses a convex cooking surface insert with radial apertures for draining. Donnellan U.S. Pat. Pub. No. 2008/0017048 discloses a grease strainer insert Wang U.S. Pat. No. 5,826,494 discloses a cooking device including a container, a collecting pan, a straining member and a cover and suggests that the device may be used for removing excess oil from food. Marriot U.S. Pat. No. 6,827,224 discloses a food strainer that fits multiple pot and pan sizes for the use of straining liquid from solid food. Sizer U.S. Pat. No. 7,021,202 discloses a disposable strainer for use in lining a pot, pan, or kettle in which food is deep fried. Sheu U.S. Pat. No. 5,740,937 discloses a combination pan, consisting of a frying pan with a steamer pan insert.

Collard U.S. Pat. No. 5,323,693 discloses a convex cooking surface insert with radial apertures for draining during the cooking process. The convex nature of the insert fails to account for foods which must be contained, allowing cooked food to fall back into the grease from which it was extracted. The present invention allows for containment of the food in a separate concave skillet.

Donnellan U.S. Pat. Pub. No. 2008/0017048 discloses a flat grease strainer insert, which fails to prevent cooked foodstuffs from falling back into the grease upon extraction of the grease strainer insert from the pan.

Wang U.S. Pat. No. 5,826,494 discloses a cooking device including a container, a collecting pan, a straining member and a cover and suggests that the device may be used for removing excess oil from food. However, this differs from the present invention in that Wang teaches a device that can be used for steaming or deep frying, situations involving liquid and oil being directly used in the cooking process. The present invention teaches a device to remove oil and grease from the foodstuffs being cooked, resulting in a healthier, less greasy final product.

Marriot U.S. Pat. No. 6,827,224 discloses a food strainer that fits multiple pot and pan sizes for the use of straining liquid from solid food. Marriot teaches a device that is in fact a strainer lid for a pan, rather than the active cooking surface described in the present invention.

Sizer U.S. Pat. No. 7,021,202 discloses a disposable strainer for use in lining a pot, pan, or kettle in which food is deep fried. The present invention teaches a skillet for frying, seeking to remove grease from the foodstuffs. The Sizer patent is used in a situation where foods must be deep fried in the oil, which is contradictory to the objectives of the present invention.

Sheu U.S. Pat. No. 5,740,937 discloses a combination pan, consisting of a frying pan with a steamer pan insert. The steamer pan insert in Sheu differs in both function and intent from the lining skillet described in the present invention. The Steamer insert taught in Sheu is designed to suspend the food above a liquid for steaming, the liner does not itself comprise a cooking surface.

These prior art devices have several known drawbacks, in that they all teach an apparatus for the removal of grease or oil from food, however, none of these devices teach a concave insert with frying surface and a pour spout for grease collection. The aforementioned prior art exists for removal of oil following deep-frying or liquids following steaming or boiling. Additionally, the prior art devices teach the removal of grease immediately upon generation during the cooking process, while the present invention allows the practioner to determine when the grease is to be removed from the food. Additionally, the present invention allows the efficient transfer of grease without the requirement of transferring the food from the pan to a strainer and back to the pan, thus limiting the risk of spillage or splash burn injury.

SUMMARY OF THE INVENTION

In view of the foregoing disadvantages inherent in the known types of straining apparatus now present in the prior art, the present invention provides a new device for the efficient removal of grease wherein the same can be utilized for providing convenience for the user when preparing food.

It is therefore an object of the present invention to provide a self-contained straining system of one skillet placed inside a receiving skillet of similar size and shape. The lining skillet having a plurality of apertures or a mesh grid upon its base for allowing the drainage of grease into the receiving skillet upon lifting the lining skillet. Both the lining skillet and the receiving skillet have handles, allowing them to be lifted together or individually. Grease drainage is achieved by simply lifting the lining skillet. Additionally, the pour spout on the lining skillet and the receiving skillet will facilitate ease of pouring cooked food into a serving dish.

A further object of the present invention is to provide a safe, efficient and healthy method for draining grease from a skillet. The design of the device allows for a safe and efficient transfer of grease and/or food with minimal effort. The present invention can be used to facilitate healthier preparation of foodstuffs by allowing the practioner to efficiently transfer the grease from the cooking foods at their convenience.

Other objects, features and advantages of the present invention will become apparent from the following detailed description taken in conjunction with the accompanying drawings.

BRIEF DESCRIPTIONS OF THE DRAWINGS

For the purpose of illustrating the invention, there are depicted in the drawings certain embodiments of the invention. However, the invention is not limited to the precise arrangements and instrumentalities of the embodiments depicted in the drawings.

DETAILED DESCRIPTION OF THE INVENTION

Figure 1:
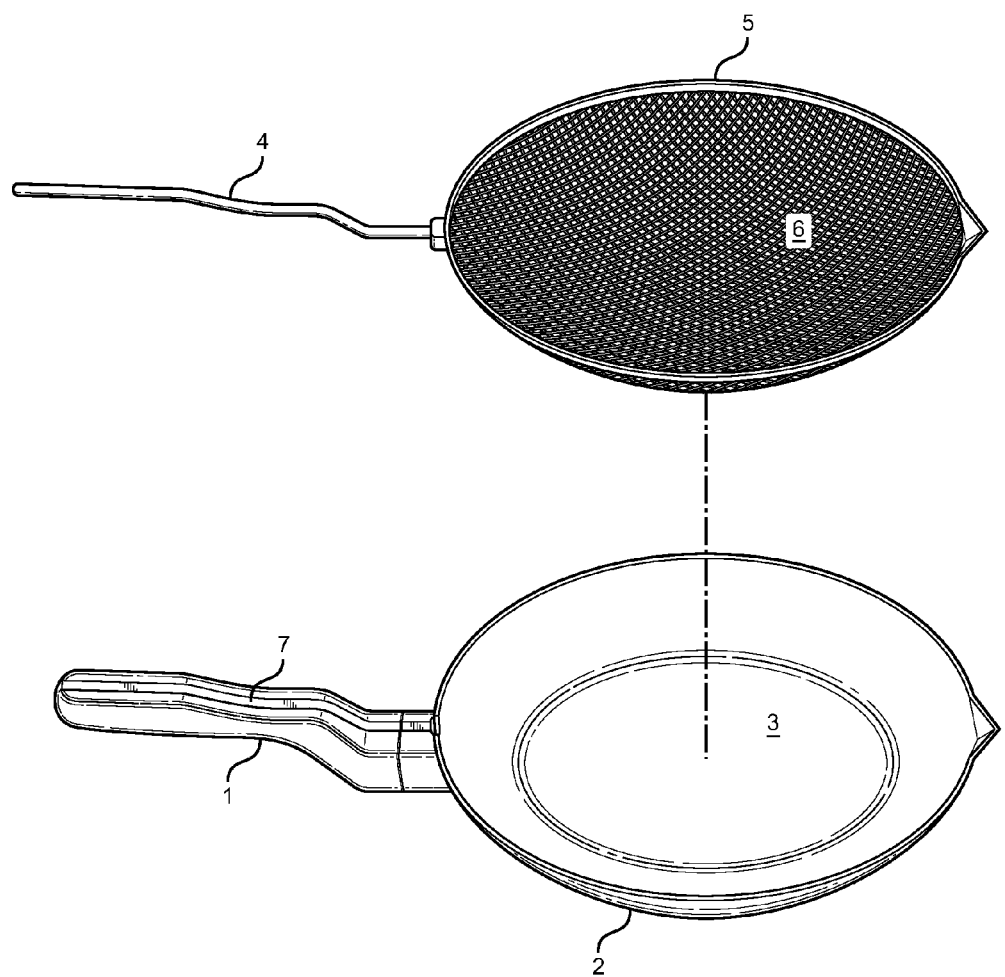
FIG. 1 is a perspective view showing the lining skillet lifted from the receiving skillet in order to facilitate the drainage of grease.

For the purpose of promoting an understanding of the principles of the invention, reference will now be made to the embodiments illustrated in the drawings. Specific language will be used to describe said drawings. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

The present invention provides a dramatic improvement over the prior art in allowing the practioner a safe, easy and efficient manner of transferring grease during and after the cooking of foodstuffs in a skillet. Grease splatter is reduced, as the lining skillet will contain splatter and assist in the efficient removal of the grease from the food. Additionally, the lining skillet is adaptable and may be used in other skillets and pans, despite said lining skillet's specific design for the receiving skillet.

Referring now to FIG. 1, there is shown the lining skillet 5 lifted from the receiving skillet 2 in such a manner as to drain the grease from the food in the lining skillet 5 into the receiving skillet 2. The receiving skillet 2 has a solid concave cooking surface 3, which may have a non-stick property, and is attached to the receiving skillet handle 1. The lining skillet 5 is a concave cooking surface and is attached to the lining skillet handle 4. The cooking surface of the lining skillet 6 is made of mesh, or in the alternative, may be a pervious surface with a plurality of apertures. The mesh or plurality of apertures may be located on the base of the receiving skillet cooking surface as well as the sides. The cooking surface may have a non-stick property. The lining skillet 5 may be suspended above the receiving skillet 2 so that grease may be drained into the cooking surface 3 of the receiving skillet 2. In the alternative, one or both of the receiving skillet 2 and the lining skillet 5, may have an attached or integrated spout to facilitate pouring of foodstuffs or grease.

Figure 2:
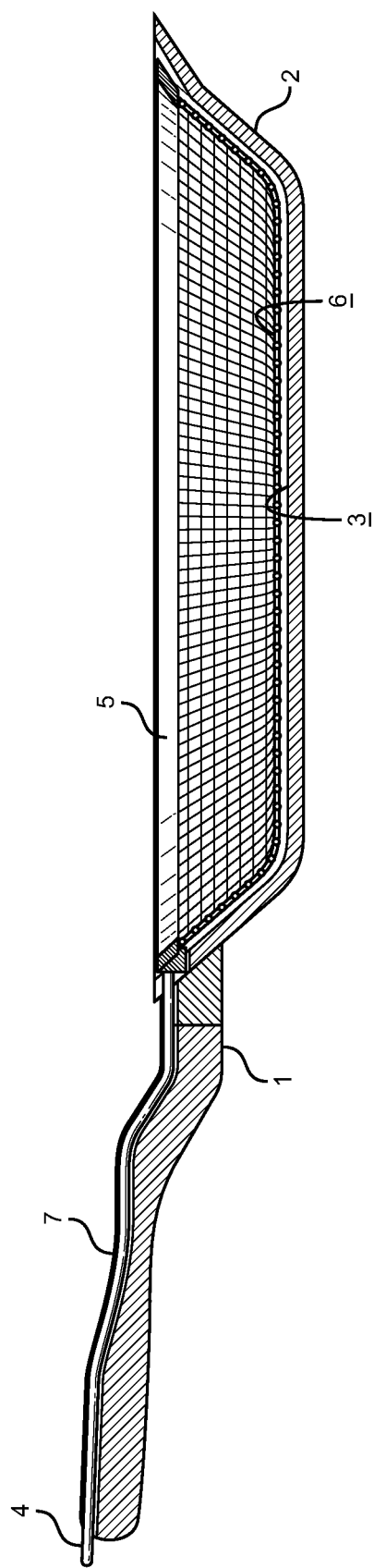
FIG. 2 is a cross-section view of the lining skillet inside the receiving skillet.

Referring now to FIG. 2, there is shown a cross-section view of the lining skillet 5 placed within the receiving skillet 2. The lining skillet 5 is shown placed within the receiving skillet 2, with the lining skillet cooking surface 6 resting against the receiving skillet cooking surface 3. Attached to the lining skillet 5 is the lining skillet handle 4. Attached to the receiving skillet 2 is the receiving skillet handle 1. Additionally, the receiving skillet handle 1 and the lining skillet handle 4 are formed in such a manner that allows them to be gripped together as a single handle or separated as necessary by the user. The receiving skillet may include a length wise depression in which the lining skillet handle may rest, such that the lining skillet handle sits within the receiving skillet handle, further allowing the handles to be gripped as one 7. Additionally, the lining skillet handle 4 will extend slightly beyond the end of the receiving skillet handle allowing the user to easily lift one or both handles as needed. The lining skillet handle 4 may fit within or against the receiving skillet handle 1. Additionally, a pour spout may be attached or integrated onto one or both of the receiving skillet 2 and the lining skillet 5.

In one embodiment, the lining skillet contains a plurality of apertures or a mesh grid on its base. In a further embodiment, both the lining skillet and the receiving skillet contain a pouring spout to facilitate in the removal of skillet contents. In a further embodiment, both the lining skillet and the receiving skillet contain a handle and a lid is included to cover both skillets. The handles of the lining skillet and the receiving skillet may be attached to the external side of the concave cooking surface. Further, the lining skillet may be placed within the receiving skillet before the food is added to the pan. To drain the grease, the user may simply lift up the lining skillet from the receiving skillet using the handle.

The teachings of the present invention include the possible inclusion of a pour spout in either or both the lining skillet or the receiving skillet. The pour spout could be integrated into or attached onto the concave wall of either the lining skillet or the receiving skillet, such that the skillet and pour spout are a single piece. Alternatively, the pour spout could be integrated into or attached onto the concave wall of both the lining skillet and the receiving skillet. In still another alternative embodiment, there is no pour spout, but the lips of both the lining skillet and the receiving skillet may be optimized for pouring.

Numerous types of materials could be used to construct the components of the teachings of the present invention. Different components could be constructed from different types of materials, having different properties. For example, the lining skillet could be have a non-stick coating, whereas the receiving skillet could be cast iron. Alternatively, both the lining skillet and the receiving skillet could have a non-stick coating. Additionally, materials such as aluminum or copper could be used in the construction of the skillets, allowing for heat transfer, and thus cooking to be optimized.

In use, the present invention offers practioners a safe and efficient method for draining grease from a skillet. According to one embodiment of the present invention, the self-contained straining skillet consists of one lining frying skillet placed inside another receiving frying skillet of similar size and shape. The plurality of apertures or the mesh grid on the bottom allows the grease to escape into the receiving skillet. The pouring spout allows the user to pour the grease from the receiving skillet. Another embodiment of the present invention allows the receiving skillet to be used alone to cook meals without grease. The receiving skillet spout will allow for the easy transfer of the food to a serving dish. In another embodiment, the lining skillet may also be used along with other skillets.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, while this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

I claim:
1. A self contained straining cookware device comprising:
a receiving skillet having a handle and a solid bottom structure which blends into an upstanding enclosing wall, said receiving skillet having a food contacting surface;

a receiving pour spout extending from said upstanding enclosing wall;

a lining skillet, having a handle and a concave shape, wherein said lining skillet fits within the concave portion of said receiving skillet, said lining skillet having a food contacting surface;

said receiving skillet handle having a lengthwise channel depression extending from an end proximal to said solid bottom structure to a distal end of said receiving skillet handle;

said lining skillet having a handle extending from said concave shape and adapted to rest within said channel depression of said receiving skillet handle, wherein an end of said lining skillet handle distal from said concave shape protrudes beyond said receiving skilling handle when resting therein.

a lining pour spout extending from a perimeter edge of said lining skillet and positioned to fit within said receiving pour spout when said lining skillet is placed within said receiving skillet;

said lining skillet having a plurality of draining apertures, allowing draining from said lining skillet into said receiving skillet upon lifting of said lining skillet.

2. The device of claim 1, wherein said food contacting surface of said receiving skillet has a non-stick property.

3. The device of claim 1, wherein said food contacting surface of said lining skillet has a non-stick property.

4. A self contained straining cookware device comprising:

a receiving skillet having a solid bottom structure which blends into an upstanding enclosing wall, said receiving skillet having a food contacting surface;

a lining skillet, having a concave shape, wherein said lining skillet fits within the concave portion of said receiving skillet, said lining skillet having a food contacting surface;

said lining skillet having a plurality of draining apertures, allowing draining from said lining skillet into said receiving skillet upon lifting of said lining skillet;

said lining skillet and said receiving skillet are each equipped with handles of sufficient length to allow lifting and which are adapted to be closely fitted to one another;

said receiving skillet handle having a lengthwise channel depression extending from an end proximal to said solid bottom structure to a distal end of said receiving skillet handle;

said lining skillet having a handle extending from said concave shape and adapted to rest within said channel depression of said receiving skillet handle, wherein an end of said lining skillet handle distal from said concave shape protrudes beyond said receiving skilling handle when resting therein;

said concave portion of both said lining skillet and said receiving skillet are each equipped with a pour spout, wherein said lining skillet pour spout fits within said receiving skillet pour spout when said lining skillet is placed within said receiving skillet;

said lining skillet fits within a variety of different receiving skillets;

wherein the food contacting surface of said receiving skillet has a non-stick property;

wherein the food contacting surface of said lining skillet has a non-stick property;

wherein said receiving skillet may be used without the presence of said lining skillet.

5. The device of claim 1, wherein said lining skillet fits flushly within said concave portion of said receiving skillet.

6. The device of claim 1, wherein said lining skillet handle fits loosely within said groove of a receiving skillet handle.

* * * * *